United States Patent Office 3,574,833
Patented Apr. 13, 1971

3,574,833
USE OF TRIMETHOPRIM AND SULFALENE AS ANTIMALARIALS
John D. Arnold, Kansas City, Mo., and Daniel C. Martin, Overland Park, Kans., assignors to the United States of America as represented by the Secretary of the Army
No Drawing. Filed Oct. 29, 1968, Ser. No. 771,636
Int. Cl. A61k 27/00
U.S. Cl. 424—229
3 Claims

ABSTRACT OF THE DISCLOSURE

The discovery that trimethoprim can be used alone or in combination with sulfalene to treat and cure strains of malaria that are resistant to known antimalarials, without any undesirable toxic side-effects.

---

The invention herein described was made in the course of or under a contract or subcontract thereunder with the Department of the Army.

BACKGROUND OF THE INVENTION

(1) Field of the invention

This invention relates to a dihydrofolate reductase inhibitor, trimethoprim, and its use separately and in combination with sulfalene, a folic acid synthetase inhibitor, in the treatment and cure of certain forms of malaria. More specifically, it relates to a discovery that trimethoprim lacks the disadvantages of other reductase inhibitors in dealing with drug-resistant strains of malaria.

(2) Description of the prior art

A number of dihydrofolate reductase inhibitors have been used in combination with a sulfonamide such as sulfalene as a two-pronged attack on the folic acid metabolic system essential to malaria parasites. The most prominent of these is proguinal and pyrimethamine. However, these suffer the same drawback as has been reported in volume 10, American Journal of Tropical Medicine, p. 317, May 1961, concerning the antimalarial chloroquine phosphate, namely the inducement of resistance to the drug in the malaria parasite. Particularly in this true concerning the P. falciparum strain found in various parts of the world, notably Vietnam, which strain has also developed a resistance to quinine. In addition, pyrimethamine has a low therapeutic-toxic index, and when combined with sulfonamides produces a depressed white blood cell count. Trimethoprim, a derivative of pyrimethamine and also a dihydrofolate reductase inhibitor, has not heretofore been tested as an antimalarial, although it belongs to a class of pyrimidines which have been found to have high antibacterial activities, e.g. U.S. Pat. No. 2,658,897, issued to Hitchings and Falco, Nov. 10, 1953.

SUMMARY OF THE INVENTION

This invention provides antimalarial drugs which have been discovered to lack the resistance-inducing characteristics of other related drug combinations having dihydrofolate reductase inhibitors. Specifically, we have discovered that trimethoprim can be administered orally either alone or in combination with sulfalene to provide radical, rapid treatment and cure of the multiresistant P. falciparum stain of malaria without any toxic side-effects.

Accordingly, it is an object of this invention to treat and cure the drug-resistant P. falciparum strain of malaria.

It is a further object to provide the above treatment and cure quickly and at dosages which lack undesirable side-effects.

It is still another object to provide the above treatment and cure utilizing a drug which has as its initial toxic effects, a self-inhibiting action which precludes overdoses.

DESCRIPTION OF THE PREFERRED EMBODIMENT

Trimethoprim, otherwise known as 2-4-diamino-5-(3,4,5-trimethoxybenzyl) pyrimidine, was obtained from Burroughs Wellcome and Company under the trade name Syraprim. Its preparation is taught by the aforesaid Pat. No. 2,658,897. Sulfalene, otherwise known as 2-sulfanilamido-3-methoxypyrazine, was obtained from Farmitalia, Milan, Italy, under the trade name Kelfizina.

To determine activity, thirty-three male volunteers with no history of prior malarial infections were given a careful medical check-up, and thereafter were infected with the Camp strain of P. falciparum obtained from a serviceman returned from Malaya. All but one of these were infected by blood inoculation, while one was by mosquito bite. It is this strain which is resistant to the 4-aminoquinolines, pyrimethamine, and chloroquanido hydrochloride, and requires at least 16 gms. of quinine base given over 10 days to cure. Infected volunteers were observed in a hospital area and daily parasite counts were taken before and during the initial parasitemia. Examination of thick smears, using the method of Earle and Perez, occurred three times a week during the 60 day post-therapy observation. Before treatment, the maximum concentrations of infected cells for parasitemia varied from 180 to 67,440 per cubic millimeter. Treatment was started after one day of fever and after two or more days of confirmed parasitemia. For twelve of the volunteers, the treatment consisted of a single oral dose of 0.75 gm. of sulfalene plus 0.5 gm. of trimethoprim. Of the others, eight volunteers were treated with a single oral dose of 1 gm. of sulfalene, three were treated with 0.075 gm. of pyrimethamine for three days, seven were treated with dosages of 1.5 gms. of trimethoprim per day divided into between two to six doses for seven days, and three volunteers were repeatedly given lesser dosages of the combination given to the aforesaid eleven volunteers to verify the minimum effective dosage level of the combination and to determine if recrudescence and repeated exposure to the drug would indure resistance. The results are indicated in Table 1, wherein the same categories are stated for the known antimalarial chloroquine by way of comparison. No difference was noted in the case of the volunteer infected by mosquito rather than by inoculation.

TABLE 1.—THERAPEUTIC ACTIVITY

| Drug | Daily dose, gms. | Parasite clearance, days | Patients studied | Recrudescences |
|---|---|---|---|---|
| Sulfalene | 1 | 5.5 | 8 | 0 |
| Trimethoprim | 1.5 | 2.3 | 7 | 5 |
| Combination of the above | {0.75 / 0.5} | 2.1 | 12 | 1 |
| Chloroquine | 3 | 3.5 | ---------- | [1] Yes |
| Pyrimethamine | 0.075 | [2] | 3 | 3 |

[1] Seldom cures.
[2] Failed to clear.

TRIMETHOPRIM

When used alone, this drug produced a rapid remission in all cases, and in two cases a cure. To determine if further cures could be obtained, the five volunteers who recrudesced were given repeat treatment, plus two other volunteers who had been given a different initial treatment. Of these, four were proven to be cured. Therefore, the total cured by trimethoprim alone was 6 out of 9 treated. This is totally unexpected in view of the fact that both trimethoprim and the ineffective pyrimethamine are dihydrofolate reductase inhibitors and therefore should act at the same point of the metabolic sequence of nucleotide synthesis. Furthermore, the ineffective pyrimethamine has a biological half-life which is considerably greater than trimethoprim. Ordinarily this longer half-life would result in longer cooperation with the long-acting sulfalene. The fact that trimethoprim is nonetheless effective must mean that the internal mechanism of the dihydrofolate reductase inhibition is different in the case of the trimethoprim.

To test for toxicity, the jejunal biopsy was examined of four volunteers who had received 1.5 gms. of trimethoprim daily for fourteen days. These were normal for all four in terms of villous size and cellular structure. Bone marrow biopsies done on these same four volunteers were normal. However, it was noted that administration of more than 1.5 gms. per day of trimethoprim divided into six doses did cause gastrointestinal distress. This type of initial toxic side-effect is desirable because it tends to prevent any further overdose. In marked contrast, however, was the toxicity study conducted on the three volunteers who were given the pyrimethamine treatment described above. All three had a marked granulocytopenia and white blood cell count depressed below 3,000 per cubic millimeter.

TRIMETHOPRIM AND SULFALENE

Referring again to Table 1, it is apparent that a single dose of the combination produces a complete cure in almost every case, and does so in a very short time. In the one case of recrudescence, a second identical treatment did result in a cure. In addition to these excellent results, Table 1 also indicates that synergism exists to some extent in combination of trimethoprim and sulfalene. As was indicated in discussing above the use of trimethoprim alone, these results are totally unexpected.

To test for toxicity of the combination of sulfalene and trimethoprim, studies were made of three different groups of normal noninfected volunteers utilizing the following laboratory determinations: hematocrit value, white blood cell count (WBC), WBC differential count, platelet count, blood glucose, blood urea nitrogen (BUN), alkaline phosphatase, serum glutamic oxaloacetic transaminase levels, bilirubin clotting time, and hemaglobin. These were determined immediately prior to therapy, and the following days after therapy: 4th day, 18th day, 25th day, 39th day, 53rd day, and 60th day. In addition, the second and third groups had a bone marrow biopsy taken on each volunteer once each week. The first group consisted of ten volunteers who received 1.0 gm. of sulfalene and 0.5 gm. of trimethoprim twice a week for three months, the second consisted of ten who received 1.0 gm. of sulfalene and 1.0 gm. of trimethoprim twice a week for 60 days, and the third consisted of fifteen who received 1 gm. of sulfalene and 1.5 gms. of trimethoprim twice a week until headaches, nausea, anorexia, and abdominal cramps forced all but four of the volunteers to return to the dosage levels administered to the second group. When this was done, gastrointestinal effects of the larger dosage taken by the third group disappeared. The four who continued on the larger dosage received treatment for a total of 60 days. In all cases, all laboratory results and bone marrow biopsies were normal, indicating that the only toxic side-effects were the gastrointestinal ones experienced by some who received the largest dosage of 1 gm. of sulfalene and 1.5 gms. of trimethoprim. As in the case of trimethoprim used alone, the gastrointestinal toxicity is advantageous as the initial toxic side-effect, as it tends to preclude overdoses.

We claim:
1. A process for the therapeutic treatment and cure of the multiresistant *P. falciparum* strain of malaria in mammals comprising the oral administration to a mammal in need of said treatment of 0.75 gm. of sulfalene and 0.5 gm. of trimethoprim in a single dose.

2. The process as defined in claim 1 wherein the dose is repeated once after the occurrence of recrudescence, to affect a cure.

3. A process for the therapeutic treatment and cure of the multiresistant *P. falciparum* strain of malaria in mammals comprising the oral administration to a mammal in need of said treatment of 1.5 gms. of trimethoprim in six equal oral doses a day for at least seven days.

References Cited

Chemical Abstracts 68: 62713X (1968) Abstracting British Pat. 1,092,078 published Nov. 22, 1967.

Hitchings, Trans. N.Y. Acad. of Sciences, June 1961, pages 700–708.

JEROME D. GOLDBERG, Primary Examiner

U.S. Cl. X.R.

424—251